E. A. HIRNER.
KNITTING MACHINE.
APPLICATION FILED MAY 22, 1908.
1,026,206.
Patented May 14, 1912.
13 SHEETS—SHEET 6.
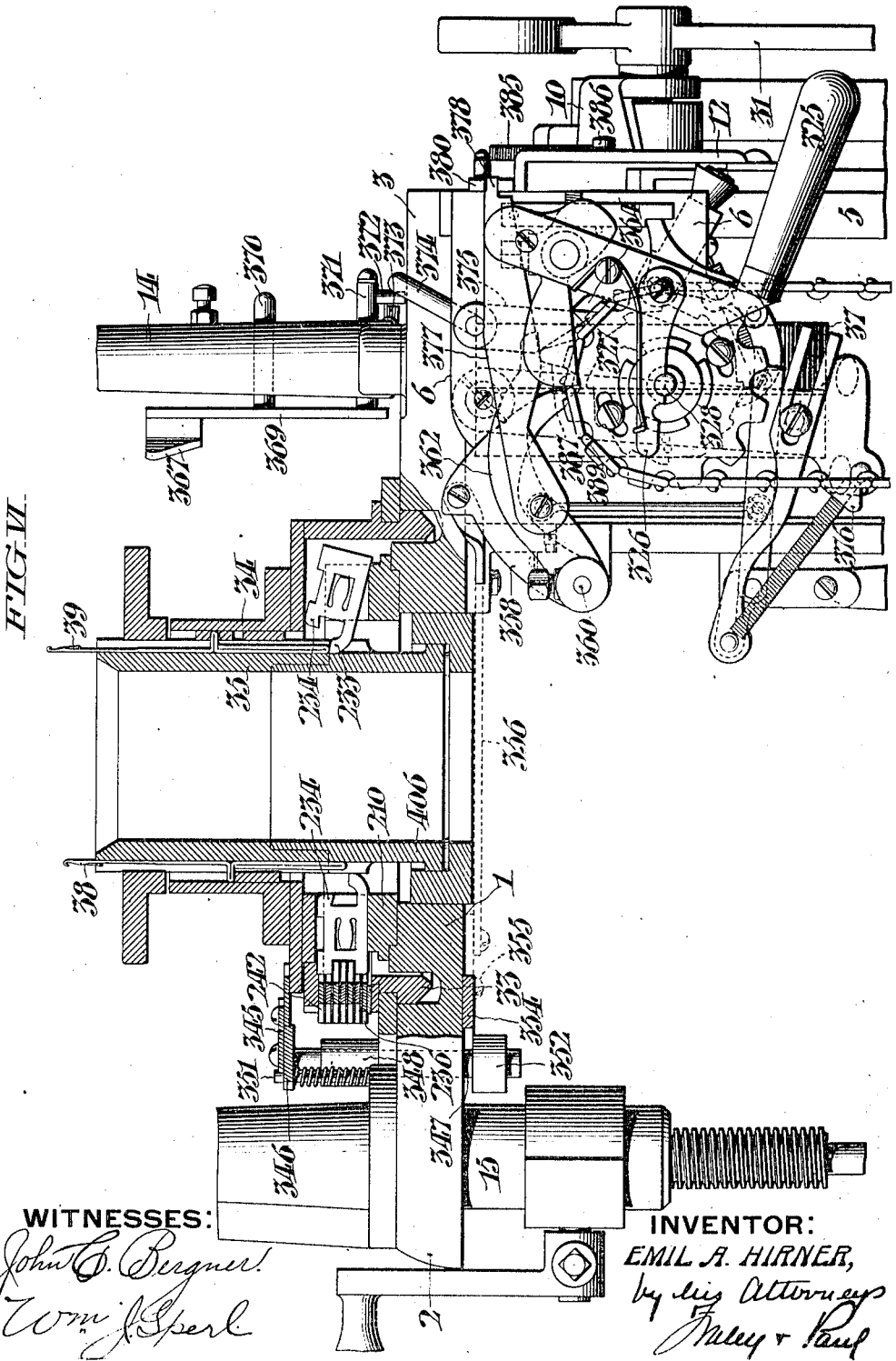
WITNESSES:
INVENTOR:
EMIL A. HIRNER,
by his Attorneys

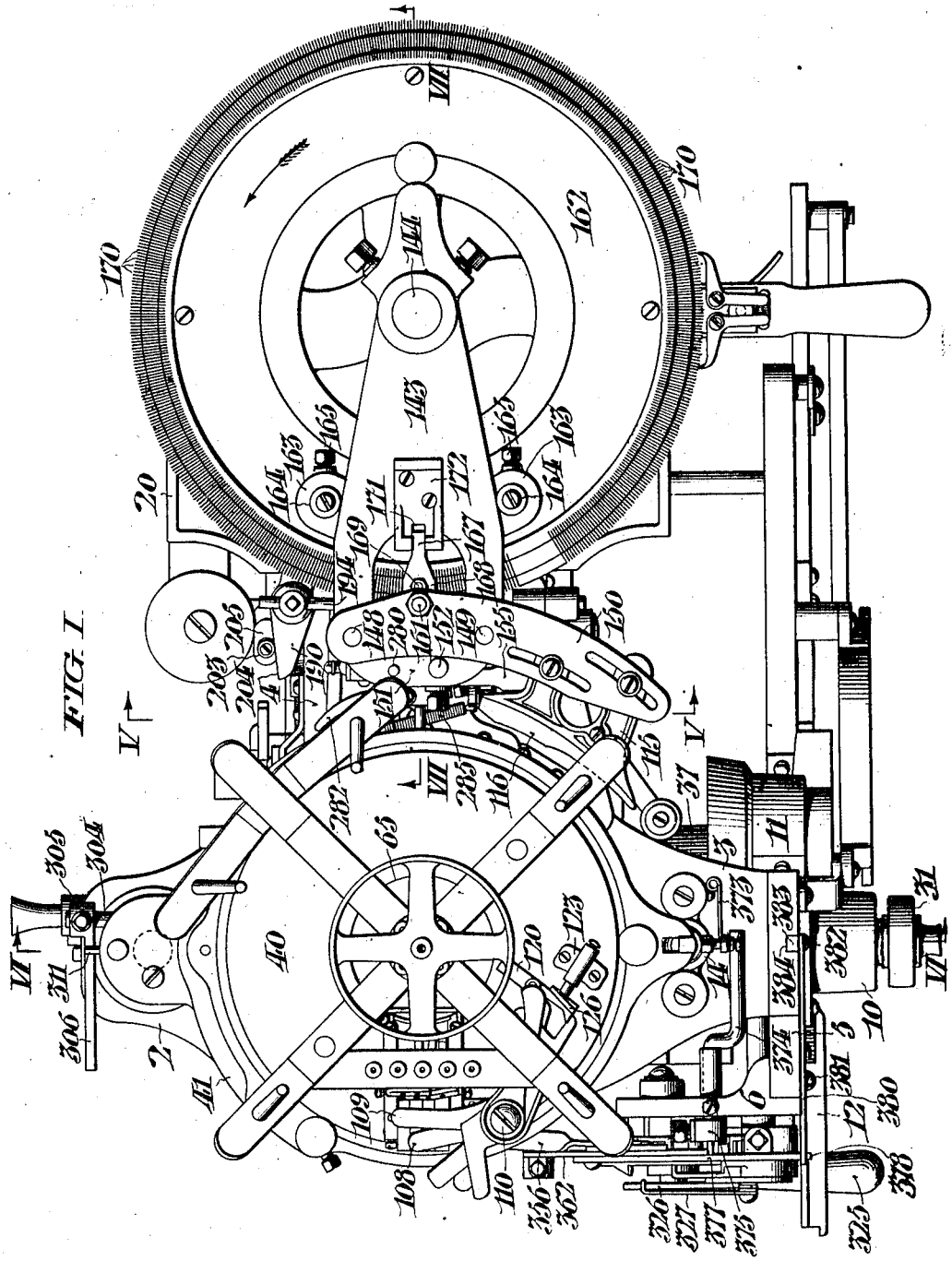

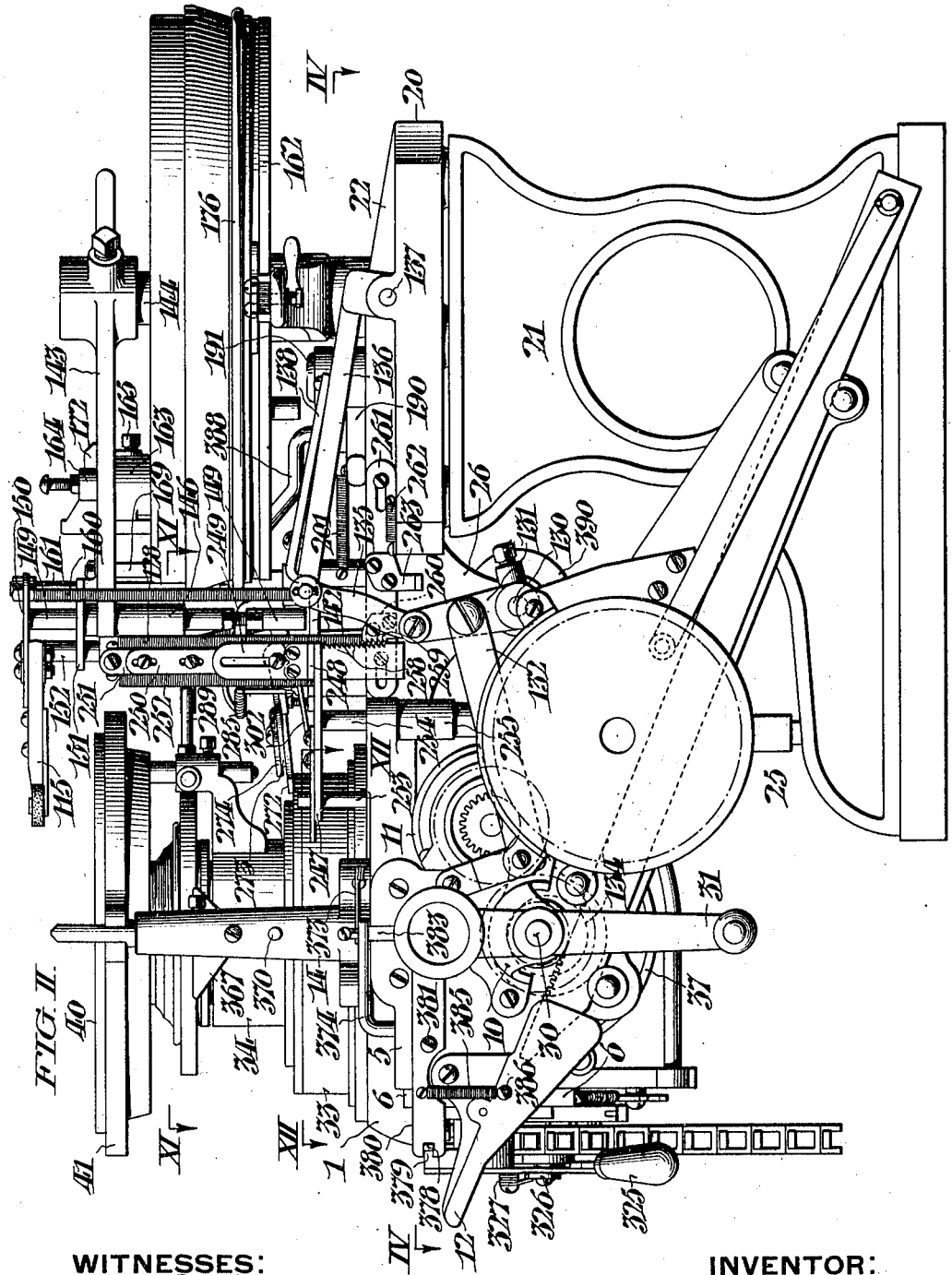

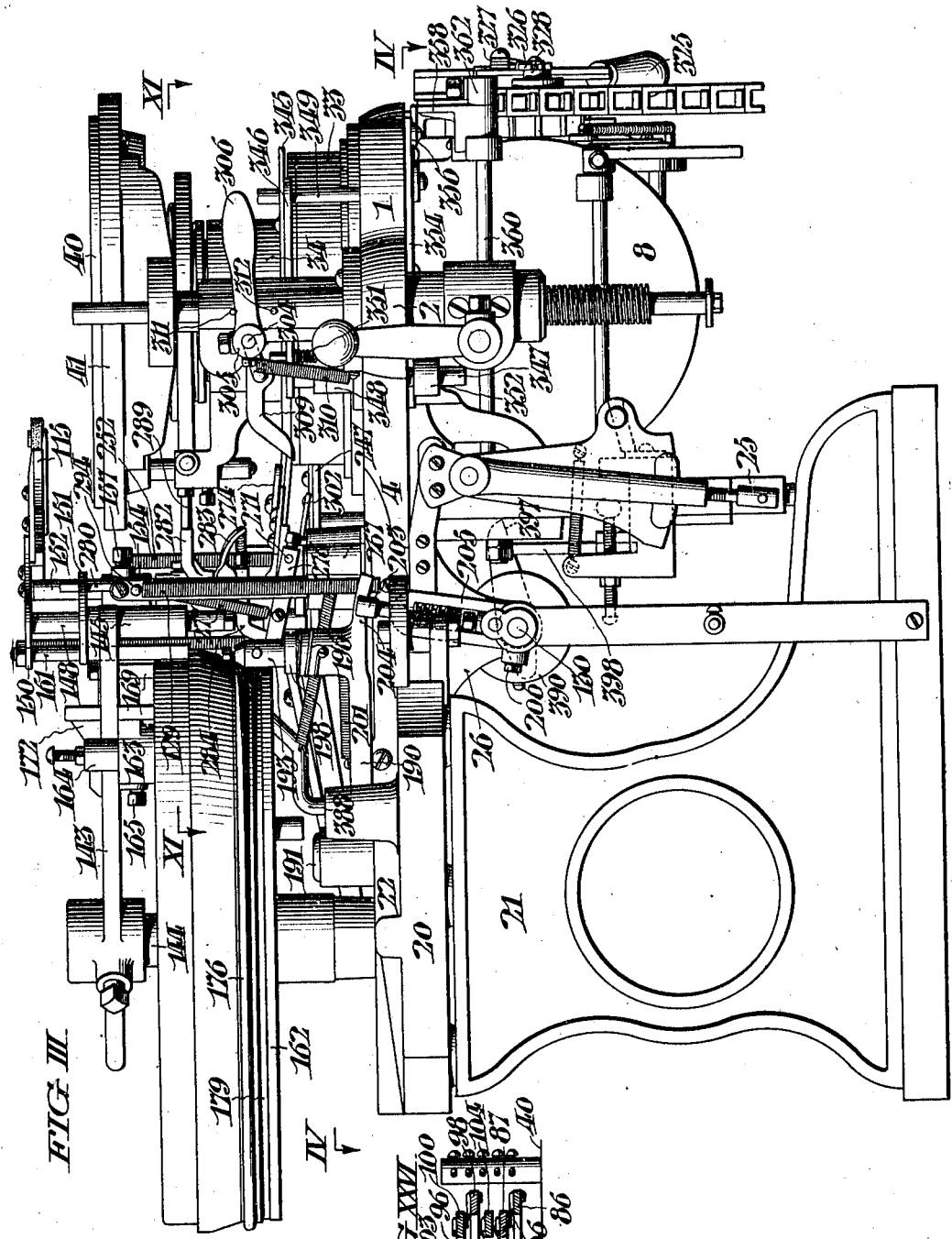

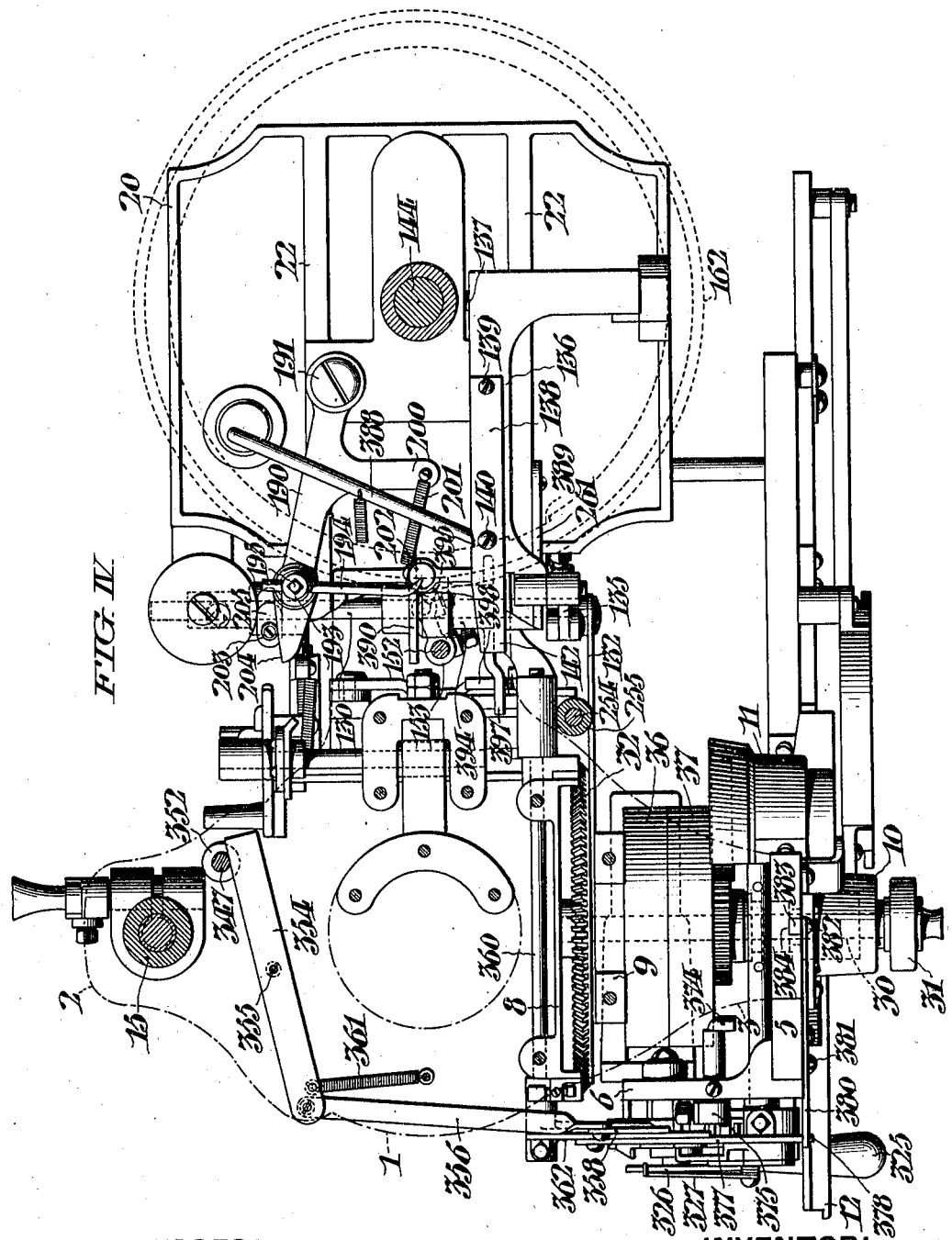

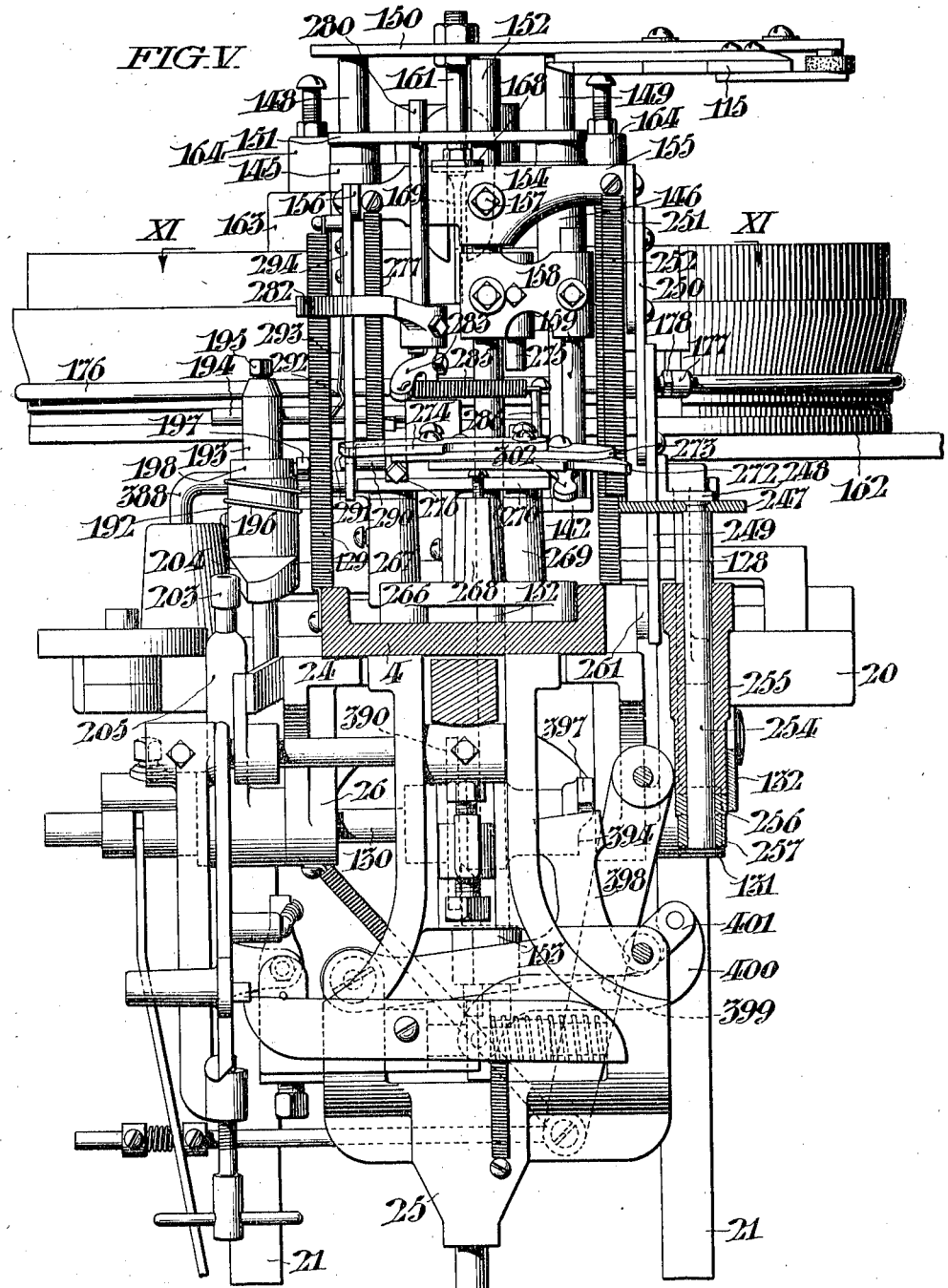

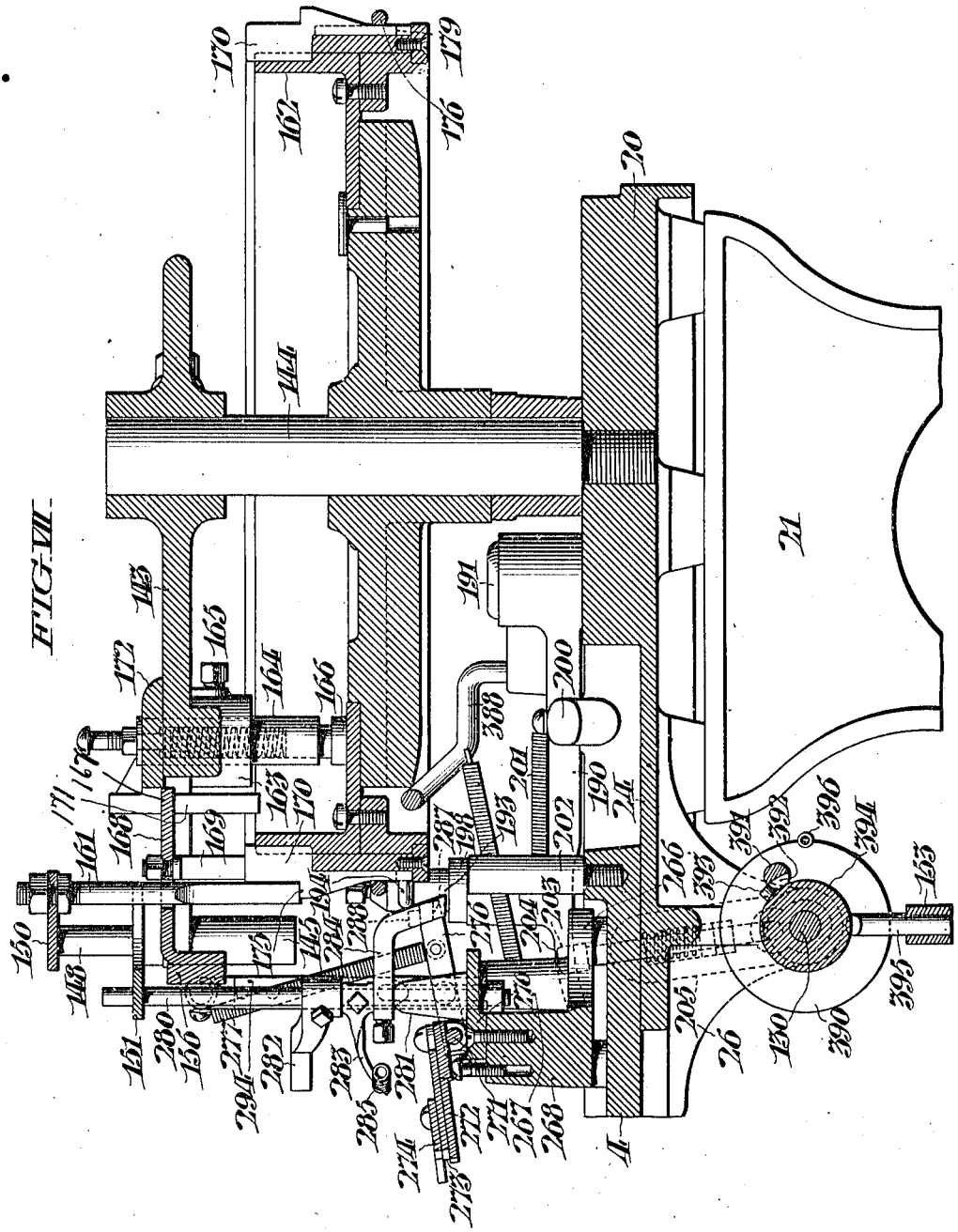

E. A. HIRNER.
KNITTING MACHINE.
APPLICATION FILED MAY 22, 1908.
1,026,206.
Patented May 14, 1912.
13 SHEETS—SHEET 8.
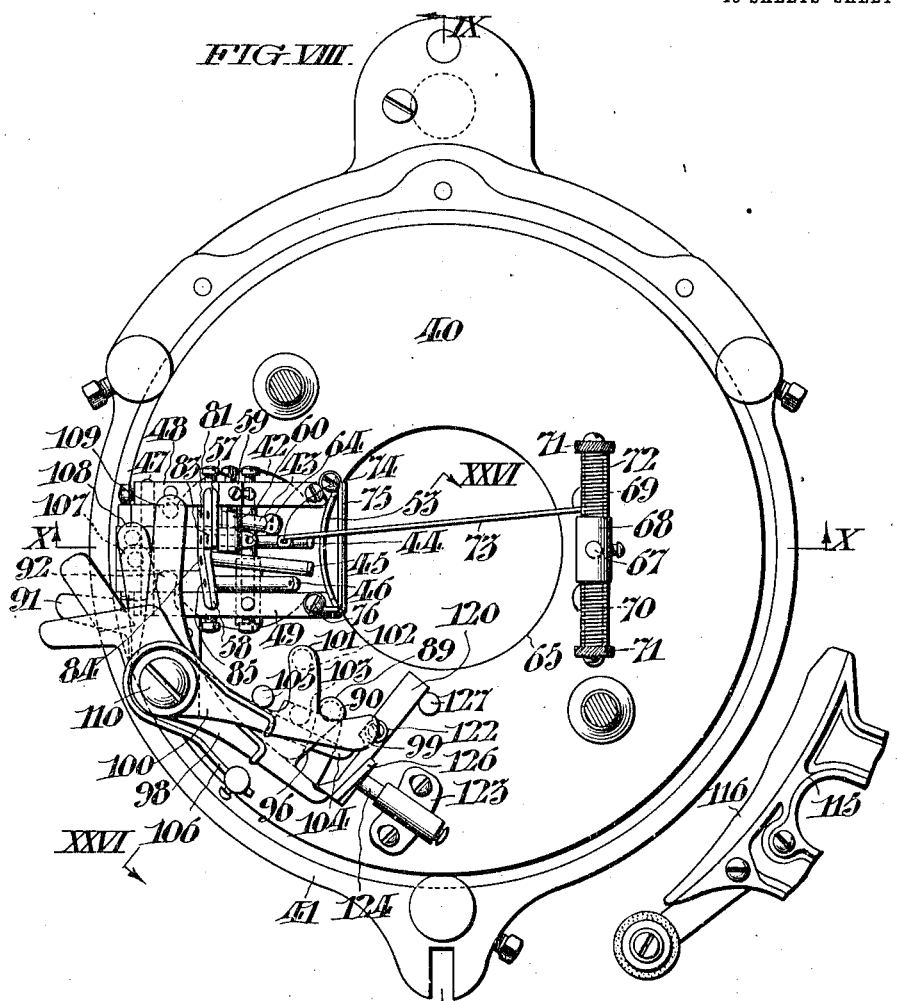
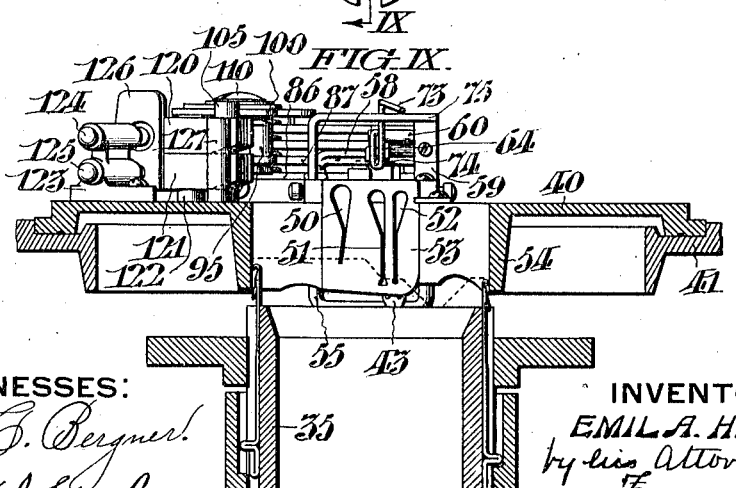
WITNESSES:
INVENTOR:
EMIL A. HIRNER, E. A. HIRNER.
KNITTING MACHINE.
APPLICATION FILED MAY 22, 1908.
1,026,206.
Patented May 14, 1912.
13 SHEETS—SHEET 9.
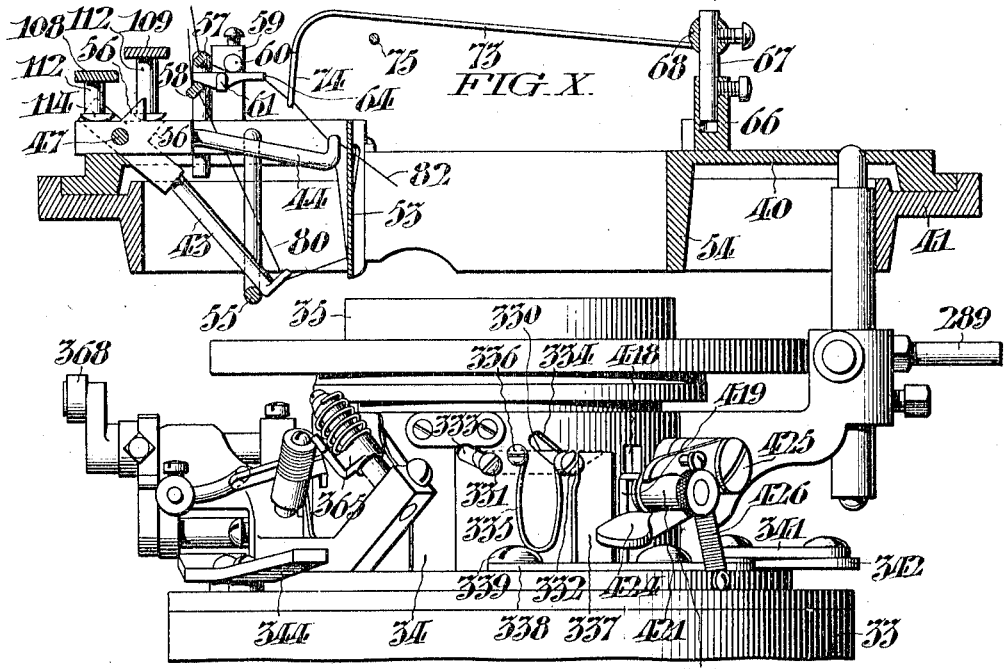
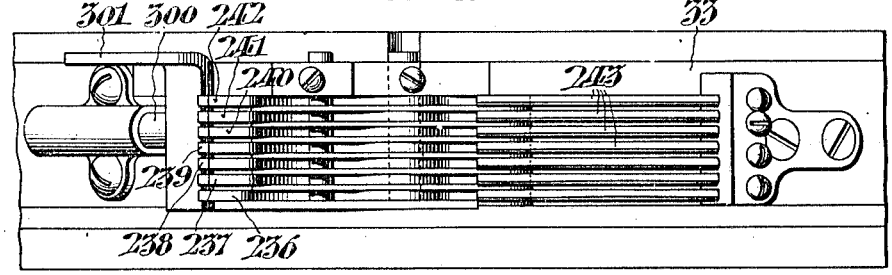
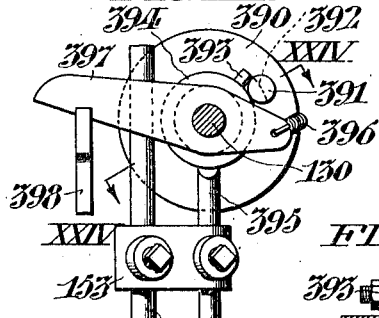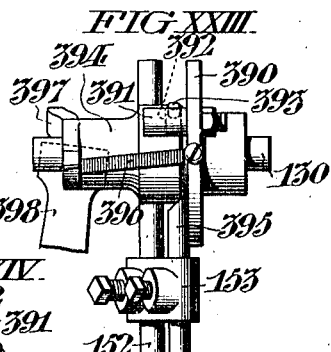
WITNESSES:
INVENTOR:
EMIL A. HIRNER,
by his Attorneys E. A. HIRNER.
KNITTING MACHINE.
APPLICATION FILED MAY 22, 1908.
1,026,206.
Patented May 14, 1912.
13 SHEETS—SHEET 10.
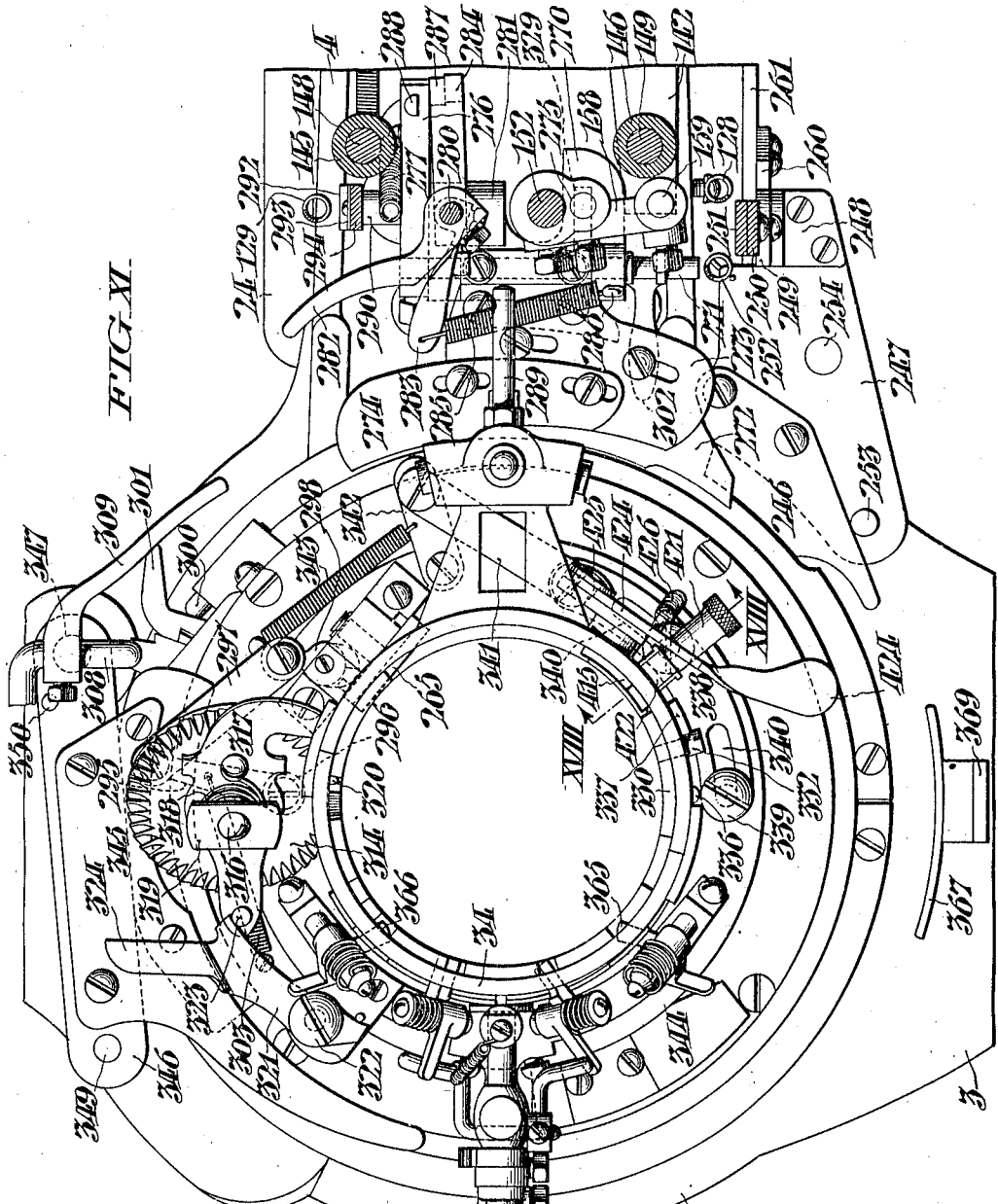
WITNESSES:
John C. Bergner
Wm J Sperl
INVENTOR:
EMIL A. HIRNER,
by his Attorneys
Miley + Paul

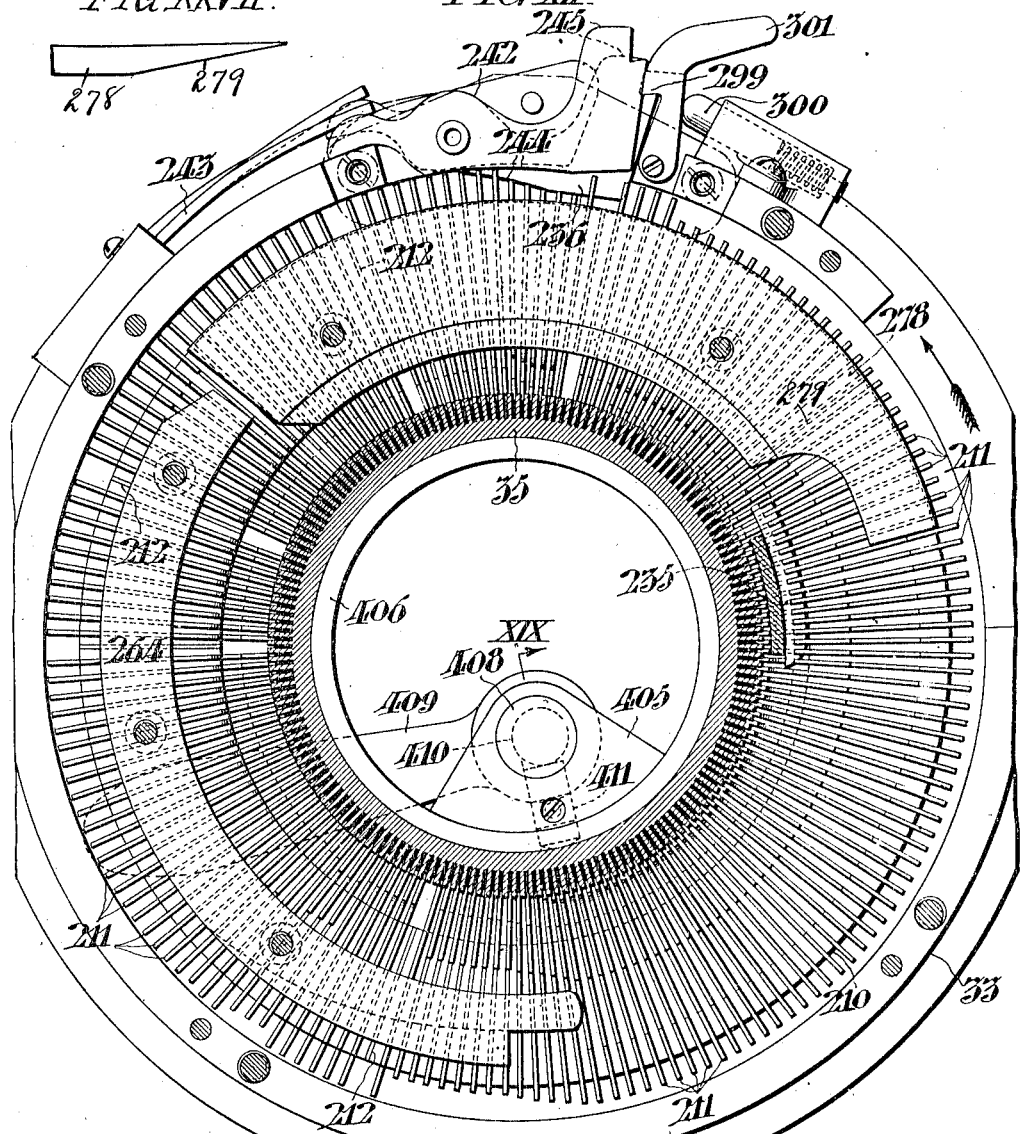

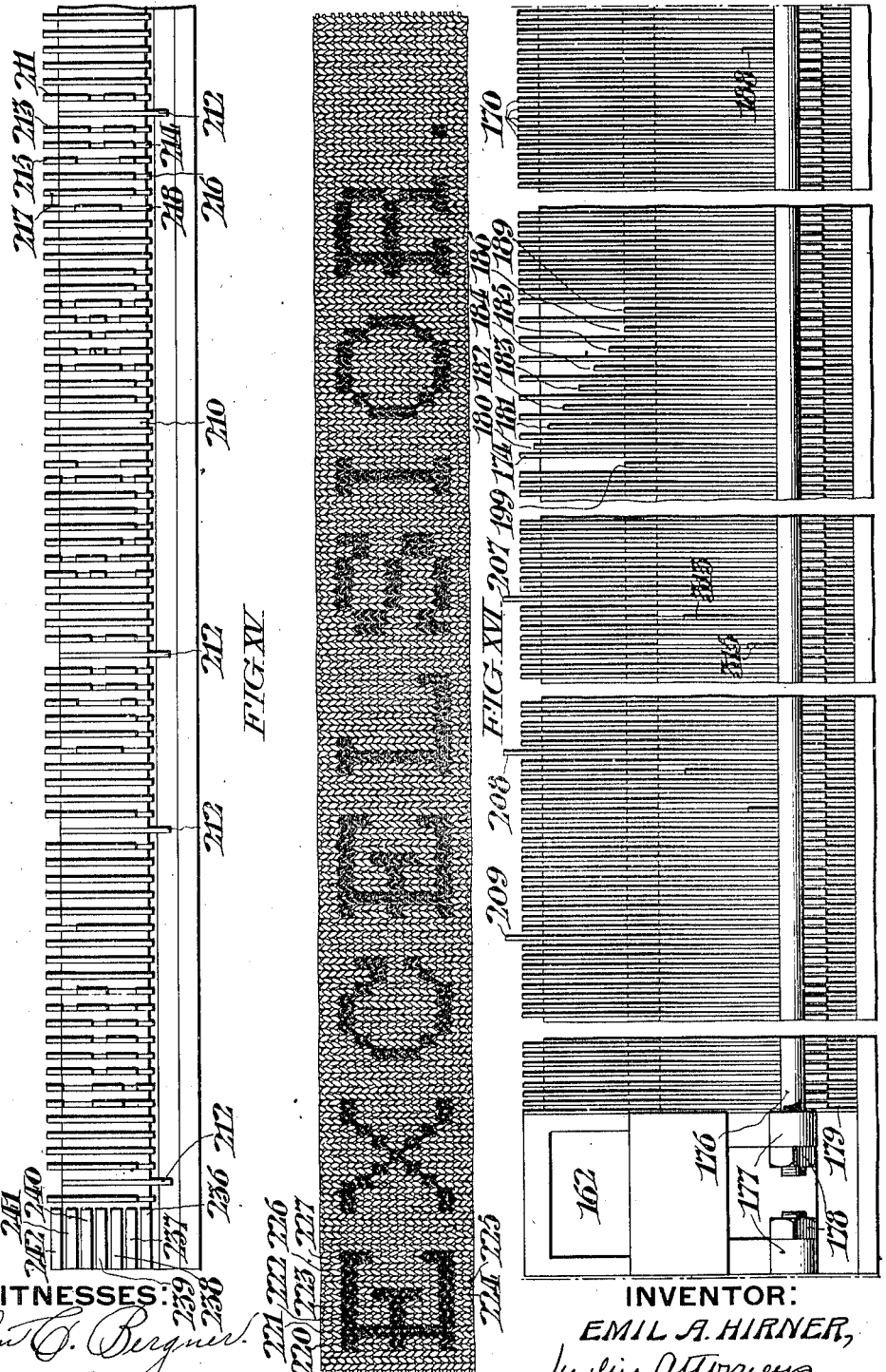

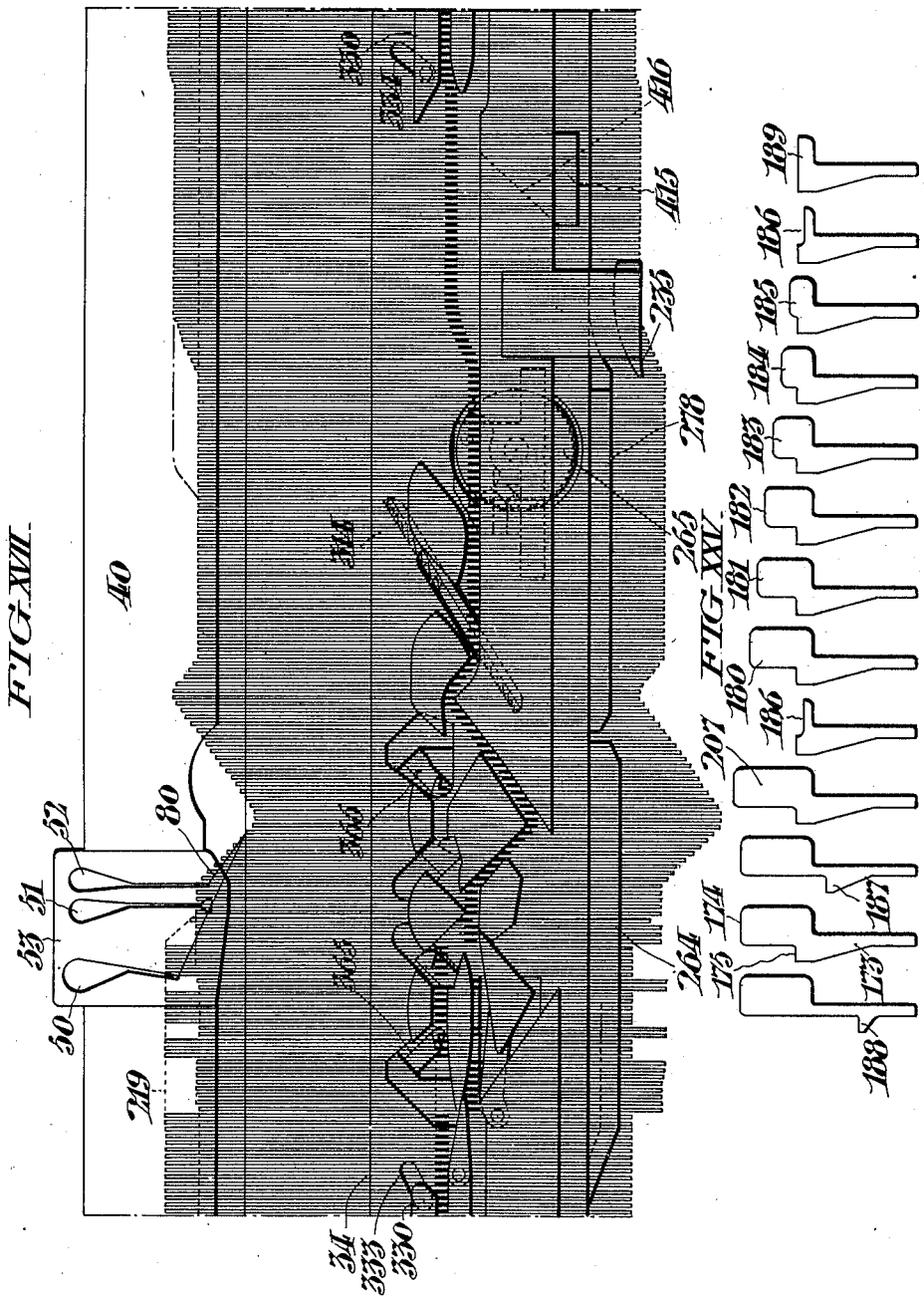

UNITED STATES PATENT OFFICE.

EMIL A. HIRNER, OF ALLENTOWN, PENNSYLVANIA.

KNITTING-MACHINE.

1,026,206.

Specification of Letters Patent.  Patented May 14, 1912.

Application filed May 22, 1908. Serial No. 434,298.

*To all whom it may concern:*

Be it known that I, EMIL A. HIRNER, of Allentown, in the county of Lehigh and State of Pennsylvania, have invented certain new and useful Improvements in Knitting-Machines, whereof the following is a specification, reference being had to the accompanying drawings.

My invention has reference to automatic mechanism applicable to knitting machines, whereby at predetermined intervals the knitting pattern may be changed, that is to say, at certain points in the knitting operation, one of the threads with which the knitting has proceeded is withdrawn from the needles.

My invention comprises the related mechanism whereby the intervals of withdrawal of the threads may be varied according to any predetermined pattern.

It further comprises mechanism whereby individual needles are controlled according to any predetermined pattern.

I have shown in the drawings, and will proceed to describe an embodiment of my invention in which it is applied to a circular stocking-knitter of standard construction for the knitting of multi-colored hose; but it must be understood that my invention is not thus limited in application, but may be applied to the changing and withdrawing of threads in any sort of a knitting machine.

In the accompanying drawings, Figure I, is a plan view of a machine conveniently embodying my invention. Fig. II, is a side elevation, omitting the bobbin carrier, looking from the bottom of Fig. I. Fig. III, is a side elevation looking from the top of Fig. I. Fig. IV, is a staggered plan sectional view taken on the lines IV, IV, in Figs. II, and III. Fig. V, is a vertical sectional view taken on the line V, V, in Fig. I, drawn to a larger scale. Fig. VI, is a fragmentary vertical sectional view taken on the line VI, VI, in Fig. I, also enlarged. Fig. VII, is a fragmentary vertical sectional view taken on the line VII, VII, in Fig. I. Fig. VIII, is an enlarged plan view of the swinging table which carries the bobbins, the thread changers and thread guides, the bobbin spider being omitted, however, to avoid complication. Fig. IX, is a sectional view taken on the line IX, IX, in Fig. VIII. Fig. X, is a sectional view taken on the line X, X, of Fig. VIII, showing the cam cylinder in elevation as seen from the bottom of Fig. I. Fig. XI, is a fragmentary sectional plan view of the machine taken on the line XI, XI, in Figs. II, III, and V, the needle cylinder being removed. Fig. XII, is a plan sectional view on the line XII, XII, in Fig. II, showing the jacks for controlling the pattern to be knit by the needles. Fig. XIII, is a fragmentary elevation of the shell inclosing the pattern jacks, showing the levers which operate said jacks. Fig. XIV, is a development of a portion of the pattern jacks. Fig. XV, shows a portion of the fabric as knitted according to the arrangement of the jacks in Fig. XIV. Fig. XVI, is a development of the jacks which control the thread changers. Fig. XVII, is a development of the cam cylinder showing the needles in the position they would occupy during the knitting of the pattern. Fig. XVIII, is a sectional view through the raising cam taken on the line XVIII, XVIII, in Fig. XI. Fig. XIX, is a sectional view through the needle cylinder clamp on line XIX, XIX, in Fig. XII. Figs. XX, and XXI, show two of the several kinds of pattern jacks. Figs. XXII, and XXIII, are elevations of the tripping means for causing the shifting of the belt. Fig. XXIV, is a sectional view taken on the line XXIV, XXIV, in Fig. XXII. Fig. XXV, is a view showing the various forms of jacks contained in the pattern wheel controlling the thread changers. Fig. XXVI, is a section on line XXVI, XXVI, in Fig. VIII. Fig. XXVII is a detail of one of the cams for the pattern jacks.

In order that the drawings may be more easily understood, it will be convenient to first enumerate and refer to the fixed parts by which the mechanism proper is supported, although these parts are not essential to my invention, as the moving mechanism may be supported in any way which is found convenient. I will therefore first specify these parts:—The mountings,—the bed plate 1, which carries the knitting cylinder, is of circular outline, with a left-hand wing-plate 2, a right-hand wing-plate 3, and a rearwardly projecting ledge 4. To the right of wing-plate 3, a dependent plate 5, is secured, and to this dependent plate is secured a journal plate 6, so as to be below and in front of the wing-plate 3. A depending guard-plate 8, is secured to the under side of the wing-plate 3, at its left hand side, and between the guard plate 8, and the depending plate 5, the journal block 9, is secured to the under side of said wing-plate. To the right of plate 5, is secured an irregular journal casting 10, behind said plate is the irregular cap piece 11, and in front of this plate is secured the guard plate 12. On top of the wing-plate 3, is an upright standard 14. The left hand wing-plate 2, carries centrally a large sleeve 15, which passes through it, projecting both above and below it.

All of the foregoing parts find their support in an octagonal table 20, which is supported by wide side standards 21, 21. Its top is cast with two intermediate longitudinal ribs 22, 22, between which the top is projected forward in the form of a shelf 24, to which is screwed the rearwardly projecting ledge 4, of the bed plate 1, which with all its parts is thus supported by the table 20. Additional support is given the front of shelf 24, by means of the bifurcated central standard 25. The shelf 24, is cast with heavy depending journal flanges 26, one on either side.

The comprehension of the mechanism of my invention as I have illustrated it will be facilitated by dividing its description into groups as follows:—I. The parts which relate to the knitting mechanism proper. II. The thread changing mechanism. III. The cam plate which actuates the levers and its reciprocating mechanism. IV. The pattern wheel and its pawling mechanism. V. Pattern jacks for individual needles and controlling mechanism therefor. VI. Mechanism for controlling plating cam. VII. Mechanism for putting into action the raising cam for the half back needles. VIII. Mechanism for changing rotation to oscillation. IX. Mechanism for operating the lowering cam for the instep needles. X. Mechanism for operating pickers to lower the half back needles. XI. Mechanism for shifting the belt. XII. Means for clamping the needle cylinder. XIII. Cams for raising all the needles.

*I. The parts which relate to the knitting mechanism proper.*—The main shaft 30, of the machine runs transversely beneath wing plate 3. It is journaled toward its left end in journal block 9, and toward the right end in journal casting 10. The right hand projecting extremity of this shaft has detachably keyed to it a hand lever 31, by which the shaft may be turned by hand. The left hand extremity of this shaft carries the vertical bevel gear wheel 32, which meshes with a corresponding horizontal circular rack formed on the lower edge of an annular flange 33, which is mounted upon and rotates centrally within bed plate 1. The flange 33, has formed upon it the rotating cam-cylinder 34. The needle cylinder 35, is sustained fixedly within the cam cylinder. Shaft 30, carries twin fast and loose belt pulleys 36, and 37. Pulley 36, is fast to the shaft and is the ordinary driving pulley of the machine. Pulley 37, runs freely upon a projecting sleeve of pulley 36, as clearly shown in my U. S. Letters Patent No. 794,407, dated July 11th, 1905. The purpose and operation of said pulley 37, is the same as that set forth in the above patent. The needles, indicated by 38, and 39, work vertically in needle grooves around the periphery of the needle cylinder under the influence of the cams of the cam cylinder. The knitting cams and other cams on the cam cylinder are shown in Fig. XVII, and are substantially the same as shown and described in my U. S. Patent No. 753,260, dated March 1st, 1904. It will be understood that the cam cylinder is furnished, in addition to the ordinary knitting cams, with needle shifters or picks and with mechanism for throwing them into and out of action at the proper time, by means of which a continuous tube is formed by the continuous rotation of the cam cylinder around the needle cylinder, while at proper intervals the machine is caused to oscillate and heel and toe pockets are formed in the tube in a well known manner.

*II. The thread changing mechanism.*— The immediate thread changing mechanism is mounted upon the rotary plate 40, which is so mounted as to rotate in the swinging table 41. Above the rotary plate 40, are mounted the bobbin carriers, and said plate and the swinging table are mounted and controlled in the manner set forth in my Patent No. 794,407, above mentioned. Over the hole 42, at one side of the center of the rotary plate 40, is located the thread changing mechanism which consists of the four pivoted levers 43, 44, 45, and 46, having their swinging extremities turned up and pierced with thread eyes. These levers are mounted upon a pivot pin 47, which is supported at each end in the horizontal bars 48, and 49, which rest upon the upper surface of the rotary table 40, and their swinging ends when in their lowered position operate to hold their respective threads in the lower end of the V-shaped slots 50, 51, and 52, formed in the plate 53, held within the depending cylindrical flange 54, on the rotary plate 40. The lower end of each of said V-shaped slots is enlarged to form a thread carrier. The bars 48, and 49, carry a depending wire yoke 55, with its ends adjustably secured in them by set screws and having sufficient depth for its cross piece to form a rest which catches the swinging extremities of the thread changers when they are depressed. The upper side of each thread changer carries a short upright post 56, set slightly in advance of its pivot and with its top beveled toward the pivot (see Fig. X). The function of these parts will be explained in connection with the description of the operation of the levers which control the thread changers. The bar 48, carries an upwardly and laterally projecting wire arm 57, held in place by a set screw and pierced by thread apertures. A second upwardly extending and laterally projecting arm 58, is supported by the bar 49, and is pierced with four thread eyes. A post 59, projects from the upper side of the bar 48, and forms a support for the stop wire 60, and the pivot wire 61, these wires being maintained in place by set screws. The wire 61, forms a pivot for the thread lock 64, which is weighted at its outer end, and the stop wire 60, holds said thread lock in a nearly horizontal position when the thread is passing through as shown in Fig. X. Mounted on the upper side of the plate 40, on the opposite side of its central aperture 65, from the devices above described, is the post 66, having mounted therein the vertically adjustable stem 67. Adjustably mounted upon the stem 67, is the bar 68, forming two laterally extending arms 69, 70, each provided with a milled tension screw 71. From the tension spring 72, which encircles the arm 69, extends the take-up 73, terminating in the elongated eye 74, which is approximately over the swinging extremity of the thread changer 44. A horizontal stop wire 75, is made fast at one end to the bar 49, by the screw 76, and prevents the take-up arm from descending too far.

The bobbin carrier has been omitted as it forms no part of my present invention and may for convenience be similar to that shown in U. S. Patent No. 794,407, above referred to.

It will now be convenient to trace the courses of the threads after leaving their respective bobbins. The body yarn 80, passes through the thread eye 81, in the arm 58, thence through one thread aperture in the thread changer 43, and thence through the thread groove 52. The reinforcing or heel yarn 82, passes through the thread eye 83, in the arm 57, thence under the stop wire 60, thence through the thread aperture in the thread lock 64, to the loop 74, of the take-up 73, thence through the eye in the swinging extremity of the thread changer 44, and thence through the thread groove 51. The plating yarns pass through the thread eyes 84, and 85, in the arm 58, thence through the eye in their respective thread changers 45, or 46, and thence through the thread groove 50. It will thus be seen that by depressing any thread changer its thread is carried to the lower end of the corresponding thread groove where it is fed to the needles.

The mechanism by which the thread changers are successively depressed and raised, wherby the threads are successively thrown into and out of action, will next be described. The upright post 110, which is set in plate 40, in proximity to the aperture 42, has pivoted upon it five levers one above the other. The lower two levers 86, and 87, control the plating yarns and each has three arms. The long arm of the lever 86, has a lateral projection 89, which is provided with an upwardly projecting stud 90. Said lever has a cam arm 91, and a short arm 92. The long arm of the lever 87, has a lateral projection 94, having an upwardly projecting stud 95, arranged to engage the edge of the lateral projection 96, on the long arm of the lever 98, also pivoted about the post 110. The long arm of the lever 100, has a lateral projection 101, provided with a depending stud 102, which is adapted to engage the upwardly projecting stud 103, on the lateral projection 96. The lever 104, has a long arm similar to those of the other levers, but without a lateral projection and is directly under lever 99, in Fig. VIII. An upright post 105, set in plate 40, serves as a stop for all the levers in one direction. Their motion in the opposite direction is opposed by springs 106, one for each lever. Levers 86, 87, 104, and 98, have short arms 92, 107, 108, and 109, respectively which decrease in length from the lever 98, to the bottommost one, so that their extremities correspond successively in position to the pivoted ends of the four thread changers 46, 45, 44, and 43, each thread changer thus having the extremity of one of the arms playing directly over its pivot. In the extremity of each of the arms 107, 108, and 109, is set a depending post 112, terminating in a shoe 114. The length of the post is in each case such that its shoe reaches to the top of the square end of the thread changer to which it corresponds.

The position of the levers is such that their motion within the limits about to be described causes the short arm of each one, with its shoe, to slide over the top of its thread changer from one side of the pivot 47, to the other so that when said short arm is in its outermost position its thread changer is raised by the pressure of its shoe against the end of the thread changer beyond the pivot, while when the lever is in its innermost position its thread changer is depressed by the pressure of its shoe against the top of the post 56, with the bevel of which it has come in contact. Levers 87, 104, and 100, each have a cam arm similar to the cam arm 91, of the lever 86. As plate 40, rotates movement of the levers pivoted about the post 110, is caused by contact of their cam arm with a vertically movable cam plate 115, having a cam edge 116. According as this cam is raised or depressed by mechanism to be described, said levers as they are rotated come into contact with cam edge 116, and depress their thread changers, throwing the corresponding thread into its thread carrier. The movements of these levers are not independent of one another and for controlling them the following mechanism is provided:

A pair of trigger plates 120, 121, are pivoted to plate 40, on the upright post 122. A spring pressed plunger 124, mounted in the bearing block 123, presses against the trigger plate 120, passing through hole in the plate 126, which is attached to the trigger plate 121. The spring pressed plunger 125, also mounted in the bearing block 123, presses against the plate 126, and the movement of said trigger plates is limited by the post 127, mounted in the plate 40. The tripping extremity of each trigger plate is blunt at the end and furnished with a beveled surface at the side. The plate 126, extends above the top of the trigger plate 120, and is adapted to be engaged by the long arm 99, of the lever 100, whereby when said long arm is swung outwardly the lower trigger plate 121, is moved to release the long arm of either of the levers 86, and 87, which has been held by the blunt end of said trigger plate.

When the height of the cam surface 116, is such as to engage the cam arm of the lever 100, said cam arm is swung inwardly and the long arm 99, is swung outwardly. The stud 102, engages the stud 103, and the long arm of lever 98, is swung outwardly to be engaged by the blunt end of the trigger plate 130, and the short arm 109, is swung inwardly to depress the thread changer 43, which carries the body yarn. If it is desired to throw in the heel yarn the cam surface 116, is moved to the proper height to engage the cam arm on the lever 104, thus swinging in the short arm 108, to depress the thread changer and swing out the long arm of the lever 104. When this long arm is moved out along the bevel surface of the trigger plate 120, the long arm of 98, is freed from the blunt end of said trigger plate and swings inwardly under the action of its spring 106, and its short arm 109, swings outwardly to raise the thread changer 43, thus throwing the body yarn out of action. If now the cam surface 116, be brought to such a height as to engage either of the cam arms belonging to the levers 86, and 87, the long arm of the corresponding lever is swung outwardly and its upwardly extending stud engages with a co-acting member on the lever 98, and thus its long arm is swung outwardly with its end gliding along to bevel surface on the trigger plate 120. The long arm of the lever 104, is thrown out and the body yarn and a plating yarn thrown in by the action of the short arms which control the respective thread changers.

By the operation of the parts which have thus far been described the proper change in vertical position of the cam plate 115, throws any desired thread into its thread guide and simultaneously removes any other thread which may be necessary to produce the desired knitted fabric.

The thread changing mechanism above described is shown, described and claimed *per se* in my co-pending application #434,297, filed May 22nd, 1908.

The thread end guide and the cutting mechanism whereby the loose end of each thread thrown into and out of action is at the proper point cut and held ready for further use, may be similar to that shown and described in my said Patent No. 794,407, and need not therefore be herein described.

*III. The cam-plate which actuates the levers and its reciprocating mechanism.*— This, together with the pattern-wheel to be described, is the mechanism by which the height of cam-plate 115, may be varied with each rotation of the knitting machine, and thereby the succession of the multiple knitting-threads varied in accordance with any predetermined pattern.

In the journal-flanges 26, of the table 20, is journaled the rock shaft 130, which is oscillated by a lever-arm 131, set on its right-hand end, to which arm is pivoted the extremity of an eccentric-rod 132, carrying a strap which surrounds an eccentric 134, situated on the main shaft 30. The lever arm 131 extends beyond the pivot of the eccentric-rod and is pivoted to a link 135, the other end of which is pivoted to one corner of the swinging end of the irregular flat rocking lever 136. The rear edge of this lever has depending lugs in which is set its transverse pivot-shaft 137, rocking in journal-boxes on the table 20. The forward or swinging end of the lever 136, is expanded laterally and carries a transverse pivot-rod which to the right forms the pivot for attachment of link 135. To the upper surface of said lever 136, is yieldingly fastened the strap 138, by means of the screws 139 and 140. About the screw 140, and between the strap and the lever is placed a small coiled spring which forms a cushion for said strap. The free end of said straps is offset to form a step 142, which cooperates with the mechanism for raising and lowering the cam 115. A triangular plate 143, is mounted upon the large upright post 144, which rises centrally from the table 20. The front edge of this plate is forked, throwing forward two arms with depending bosses 145, and 146, within which slide vertical rods 148, and 149, fixed to the under side of plate 150. To the under side of plate 150, is screwed the cam plate 115, the vertical position of which determines the actuation of the levers mounted about the post

110. The lower end of the rod 149, is made adjustable with relation to the step 142, of the strap 138, with which it is adapted to engage. With each rotation of eccentric 134, and therefore once for each rotation of the cam-cylinder of the machine, the rocking lever 136, is moved up and down, reciprocating slide rod 149, and with it plate 150, and therefore cam-plate 115. To maintain proper co-action between the plate 150, and the lever 136, the coiled spring 160, is provided having its upper end attached to said plate and its lower end secured to the strap 138. The extent of the depression of the cam-plate 115, at each reciprocation is limited by the contact of a depending vertical post 161 with a flattened lower end set adjustably in the plate 150, with the peripheral pattern-jacks of a pattern wheel 162, to be described later on. The cam cylinder of the knitting machine is geared to the inner shaft in such relation to eccentric 134, that when the machine is in the position in which the further rotation of the plate 40, is about to bring the cam arms of the levers which are mounted about post 110, in position to be acted on by the cam edge of the cam 115, the eccentric has almost reached the end of its traverse and is about to depress the slide rod 149, to its utmost extent, so that at the moment of contact of one of said cam arms with cam plate 115, the latter will be held down under the tension of spring 160, to the utmost extent allowed by that one of the peripheral pattern jacks of the pattern wheel 162, which at the time is beneath post 161.

*IV. The pattern wheel and its pawling mechanism.*—Pattern wheel 162, is a large metal wheel mounted horizontally on the large upright post 144, which rises centrally from the table 20. Upon each side of the triangular plate 143, is a boss 163, within which a sleeve 164, is adjustably secured by means of a set screw 165; and within each sleeve is a spring pressed plunger 166, which bears upon the upper side of the wheel 162, to steady its motion. A plate 151, is secured to the upper side of the two arms of the forked end of the plate 143, and forms a guide for the upper end of the slide rod 152, which has a yoke 153, secured to its lower end. A yoke 154, having laterally extending arms 155, and 156, is adjustably secured to the slide rod 152, by means of set screws 157. Springs 128, and 129, attached to the yoke arms and ledge 4, tend to draw yoke 154, down. The yoke 158, is secured to the slide rod 152, below the yoke 154, and forms a support for a depending rod 159, having its lower end adapted to be engaged by a step 142, of the strap 138. The angle bracket 168, is fastened to the rear of the arm 156, and its horizontal arm forms a support for the depending post 169, which coöperates with the upper ends of the pattern jacks 170. The right hand end 167, of the horizontal arm of the angle bracket 168, see Fig. VII, moves in a groove 171, formed in the plate 172, which is mounted upon the upper side of the triangular plate 143, thereby guiding the up and down movement of the slide rod 152.

The periphery of the pattern wheel 162, is cut by a large number of radial slots, in which are set pattern-jacks as seen in Fig. VII; said pattern jacks having a variety of shapes, as shown in Fig. XXV. The jack 173, is the form most commonly employed. The lower end of the post 169, engages the top edge 174, of each jack and the lower end of the post 161 engages the step 175. This form of jack does not allow the posts 161 and 169 to be lowered below what may be termed their idle level. When the jacks are set in place in their slots, they entirely fill them, with only their steps projecting. They are retained in their slots by a split ring 176, surrounding the wheel and passing through lugs 177, on the periphery of said wheel. Said split ring is tightened by means of nuts 178, bearing against said lugs 177. Below the split ring 176, each of the walls between the slots is cut away as at 179, as a consequence of which the bases of the pattern-jacks when set in place form a rack, converting this part of the wheel into a ratchet wheel.

Jacks 180, 181, 182, 183, 184, 185, and 186, allow the post 169 to descend to various levels for controlling the position of another set of pattern jacks which control the movements of individual needles, as will be hereinafter explained. Jacks having steps 187, or 188, are also located at suitable intervals about the pattern wheel for limiting the downward movement of the post 161, which controls the movement of the cam 115. It will therefore be seen that by filling the slots of the pattern wheel 162, with jacks in the proper order of succession, the pattern according to which the changing of the threads of the knitting is to be effected is made. For every rotation of the machine in which a change of thread is to be made the corresponding jack is set in the proper slot of the wheel, while the intermediate slots are filled with jacks 173, which prevent any change of the thread.

In order to effect the pawling of the pattern wheel 162, the horizontal pawling lever 190, is pivoted to the top of table 20, on screw post 191. On top of this lever, near its swinging extremity, rises an upright sleeve 192, in which rotates freely a vertical post 193. The upper extremity of this post has pawl 194, set transversely through it by a set screw 195, the swinging end of the pawl playing upon the ratchet wheel formed on pattern wheel 162, by the bases of the jacks, as has been explained. The pawl is kept pressed against the ratchet wheel by the tension of the coiled spring 196, surrounding the sleeve 192, and made fast to it at one end, while its other end is made fast to a set screw 197, which secures the collar 198, to the post 193. Lever 190, has a projecting arm 200, to the end of which a coiled spring 201, is attached, the other end of the spring being fast to post 202. The oscillation of lever 190, whereby the pawling motion is effected, is imparted to it by the swinging cam roller 203, which intermittently comes into contact with an inclined cam surface 204, on the left hand side of the forward end of lever 190. By this contact the lever is thrown to the right in opposition to coiled spring 201, a sufficient distance to advance the pattern wheel to the extent of one slot. This cam roller 203, is mounted on the end of a rocking arm 205, made fast by set screw 206, to the left hand projecting extremity of rock shaft 130. As this shaft rocks under the action of the eccentric 134, once for each rotation of the machine, cam roller 203, oscillates lever 190, so as to advance the pattern wheel to the extent of one slot for each rotation of the knitting cylinder. In order to set the pattern wheel correctly for starting, a pawl 388, is provided which engages a notch 389, in said wheel.

V. *Pattern jacks for individual needles and controlling mechanism therefor.*—In order to control the movements of the individual needles for the production of designs, I provide a circular series of jacks which are slidably mounted in radial slots cut in a jack ring 210. I will describe the jacks necessary for the production of the letter "E," of the word shown in Fig. XV, and it will be understood that the other letters may be produced by providing similar jacks suitably notched. By reference to Fig. XV, it will be seen that the letters are all fourteen courses high, and may be divided into seven regions of two courses each. The jacks which control the needles for knitting the first letter "E" in the word "Excelsior," are numbered 211, to 218, inclusive. The needles for forming wales 220 to 227, inclusive are controlled by the jacks 211 to 218 respectively. The jack 211, is shown in Fig. XX, and comprises a piece of sheet metal having one edge formed with notches 228, 229, 230, and projections 231, 232. When in position in the jack ring 210, the inner ends of the notches in the jacks are flush with the outer periphery of said ring. The opposite edge is formed with a hook 233, which engages the bottom of the needle which it controls to raise said needle when the beveled face 234, engages the upper side of the cam 235. The jack ring 210, is stationary and mounted concentrically about the lower end of the needle cylinder upon the bed plate 1, and within the annular flange 33. This flange is cut away to provide an opening through which the pivoted levers 236 to 242, inclusive, may act upon the jacks within the jack ring 210. Each of said levers has one end engaged by a spring finger 243, which tends to withdraw the other end of the lever from engagement with the jacks. The inner face 244, of each lever is shaped to act as a guide or cam for forcing the jacks radially inward as will be hereinafter explained. Each of said levers also has a cam end 245, which is adapted to be engaged by the cam 246, carried by the plate 247. Said plate 247, is secured to the under side of the angle bracket 248, which in turn is attached to the slotted link 249, secured in slidable relation to a link 250. Said link 250, is adjustably secured to the depending plate 251, fastened to the outer end of the arm 155, on the yoke 154. A coiled spring 252, fast at its upper end to the arm 155, and at its lower end to the plate 247, operates to pull the cam 246, up when released after having been forced down to act upon the levers which coöperate with the pattern jacks in the jack ring 210. The plate 247, is pierced near its end to receive the upwardly extending guide post 253, and on its under side is the depending plunger 254, sliding within the sleeve 255, and having a cushioning washer 256, and a nut 257, at its lower end to prevent plate 247, from rising too high under the action of spring 252. The lower right hand edge of the slotted link 249, is formed with teeth 258, which are adapted to be engaged by the teeth 259, of the plate 260, mounted upon the sliding link 261. Said link is moved toward the left as viewed in Fig. II, under the influence of the spring 262, which is attached at one end to said link and at its other end to the table 20. By the engagement of the teeth 258, and 259, the cam 246, is held in its lowered position until said teeth become disengaged. This happens when the depending lug 263, is struck by the rocker arm 131, and moved toward the right. The extent of the downward movement of the cam 246, is limited by the engagement of the post 169, with the upper end of the jacks in the pattern wheel 162. When the post 169, engages the top of jack 189, the slide rod 152, is lowered and with it cam 246. Said cam 246, is maintained at the level to which it has been depressed for instance that of lever 236, by the engagement of teeth 258, and 259, until the cam arm 245, of said lever is engaged by said cam 246, and lug 263, is struck by crank arm 131, whereupon, the teeth 258, and 259, become disengaged and cam 246, is drawn up under the action of spring 252, until washer 256, engages the lower end of sleeve 255.

This places cam 246, high enough to pass above the cam arm of the upper lever 242. When cam 246, engages cam arm 245, of lever 236, its cam surface 244, is forced inwardly as shown in Fig. XII. Each lever is maintained in its inner position by a catch 299, which is pressed by the spring pressed plunger 300. At the upper end of catch 299, is a laterally projecting finger 301, adapted to be engaged by finger 302, on shaft 271. As a new lever is forced behind said catch any lever held thereby is freed under the action of its spring finger 243. As cam cylinder 34, rotates, the cam surface 244, passes across the outer end of the pattern jacks in jack ring 210. Those jacks having portions extending sufficiently beyond the outer periphery of jack ring 210, and in line with the cam surface 244, of lever 236, are forced radially inward by said cam surface. These jacks having notches in the path of movement of said cam surface are not effected thereby and consequently remain in their outer position.

By reference to Fig. XIV, it will be seen that the jacks 211 to 218 inclusive are notched at their lower end and are therefore not affected by lever 236. The other jacks are affected or not according to the location of their notches. Those jacks which are forced inwardly by the levers have their beveled faces 234, brought into contact with cam 235, whereby the inner ends are pushed upwardly as shown on the right hand side of Fig. VI. The hook 233, then engages the bottom of the needle above it and forces it up to the level 219, so that it may take the plating yarn fed through slot 50, and the body yarn fed through slot 52. Those jacks having slots opposite a lever are not pushed in by said lever and consequently their hook end is not raised to push up the corresponding needle, such needles therefore do not rise high enough to take the plating yarn, but merely the body yarn, and the plating yarn is floated. Thus the plating yarn does not appear on the face of the fabric and consequently the body yarn alone shows to produce the pattern. After the jacks pass beyond the cam 235, they are met by cam 264, which is secured to the under side of the horizontal flange of the cam cylinder. This cam fits within the notches 238, in the upper edge of the jacks and operates to draw said jacks to their outward position. A cam 278, similarly mounted in said flange, having one end beveled at 279, then engages the jacks upon their upper edge and causes all to remain level while passing the cam surface 244, and wheel being pushed in by said surface. The next step after the lower lever has been thrown in is to put the plating cam 265, out of action.

VI. *Mechanism for controlling plating cam.*—A plate 266, is fastened to the wing 4, and has three upwardly projecting bosses 267, 268, and 269, which form a support for the journal bracket 270, in which is journaled the horizontal shaft 271. Upon this shaft is mounted the plate 272, to which the cam plates 273, and 274, are adjustably secured. The plate 272, has a rearwardly extending projection which is adapted to be engaged by the post 275, when said post moves downward sufficiently. The engagement of post 275, with said projection causes the cam plates 273, 274, to be raised to control the movement of the plating cam 265. For maintaining plate 272, in its upper position as shown in Fig. VII, a rearwardly extending arm 276, is fastened to shaft 271, said arm having one end of a coiled spring 277, attached thereto. The other end of spring 277, is attached to the yoke arm 156. A vertical shaft 280, has its upper end guided by plate 151, and its lower end passes through a boss 281, on plate 270. About this shaft the three fingers 282, 283, and 284, are mounted. A coiled spring 285, is fast at one end about the post 286, and at its other end to the finger 283. This spring rotates shaft 280, sufficiently to cause finger 284, to bear against the arm 276, and to engage its upper face at the outer end to maintain cam arms 273, and 274, in a raised position when they have been raised by the mechanism already described. Said finger 284, has a step 287, formed in its outer extremity which fits a projection 288, on arm 276. When step 287, rests upon the top of projection 288, cam plates 273, and 274, are maintained in their uppermost position, and when step 287, rests upon the upper side of arm 276, said cam plates assume an intermediate position. In order to release the arm 276, from the finger 284, the curved finger 282, is provided secured to shaft 280, and in the path of finger 289 which revolves with the cam. Upon the side of arm 276, is a post 290, having its outer end notched at 291, to receive the bend 292, of the leaf spring 293, fastened to the slotted link 294, which is attached to the end of the yoke arm 156. When the spring bend 292, engages the notch 291, the arm 276, is moved sufficiently to bring the cam plates 273, 274, to their intermediate position, but the engagement is not positive enough to prevent said arm from being lowered still more under the action of post 275, which takes place when post 169, comes in contact with the top of pattern jack 186. When such is the case spring 293, merely guides over notch 291.

Plating cam 265 which serves to lift the needles to take yarn from the guide 50 when the jacks 211 are not in use, is substantially the same in construction and operation as that shown in my Patent No. 753,260, referred to above. A lever 295, is pivoted at one end about the screw 296, and has its other end pivotally connected to link 297, which in turn has its other end pivotally connected to arm 298, which operates said plating cam. The swinging end of lever 295, is thickened so that it may be engaged by cam plate 274, when said cam plate is in its raised or its intermediate position. A spring 303, connected to lever 295, operates to keep said lever in its vertical position. After the plating cam is put out of action, the pattern is knit according to the pattern jacks in the jack ring and each lever 236, to 242, inclusive is forced into action. When the pattern has been knit by the use of the needle jacks, the lever 242, is freed by its engagement with finger 302, said finger and the cam 274, having been raised to the proper position to engage finger 301, and lever 295, respectively. The engagement of lever 295, by cam 274, acts to throw the plating cam 265, into action again.

*VII. Mechanism for putting into action the raising cam for the half back needles.*—A horizontal shaft 304, see Figs. I and III, is mounted in the sleeve 305, and provided on one end with a handle 306. The other end 308, see Fig. XI, of said shaft 304, is offset, and to this offset end is secured the curved finger 309. A coiled spring 310, is fastened at its upper end to said shaft and at its lower end to the bed 2. Said spring 310, normally maintains the handle 306, against the stop 311, and the downward movement of said handle is limited by the stop 312. The raising cam 314, is mounted upon an inclined axis 316, and about said axis is also mounted a spring pressed lever 317, having on its under side a projection which engages a depression in the upper face of said cam whereby said cam may be given a partial rotation to bring its teeth into the path of the needles which are to be raised. The spring 318, is secured at one end to lever 317, and at its other end to plate 319, and tends to maintain the cam 314, with its notch 320, in such a position that the needle butts may pass through it as shown in Fig. XI. In one end of lever 317, is an upwardly projecting post 323, which is in contact with the inner edge of the lever 321, pivoted about the stud 322, and having a laterally extending finger 324, adapted to come in contact with the end 308, of shaft 304, when said shaft end is raised by means of the hand lever 306. When so engaged the finger 324, is forced inwardly and cam 314 is given a partial rotation to bring its teeth into the path of the needle butts, whereupon the needles are raised until said cam has made one revolution, and its notch 320, is again in the position indicated in Fig. XI.

*VIII. Mechanism for changing rotation to oscillation.*—The mechanism for changing from rotation to oscillation is substantially the same as that set forth in my Patent No. 794,407, above referred to. The clutch for effecting this change is operated by the hand lever 325, which carries a pivoted notched arm 326, depressed by spring 327, so that the notches engage a forwardly projecting post 328. When lever 325, is thrown so that the nearest notch is in engagement with post 328, the clutch is uncoupled and oscillation of the cam cylinder ceases. When it is thrown to the other notch, the clutch is coupled as soon as the oscillating mechanism begins its first forward movement. For the construction of the pattern chain and its pawling mechanism reference may also be had to the above patent.

*IX. Mechanism for operating the lowering cam for the half back needles.*—The lowering cam 330, on the inside of the cam cylinder has two guide screws 331, 332, which slide in slots 333, and 334, respectively, and is normally maintained in its lower position by a spring 335, fastened at one end by a screw, 336, to the cam cylinder and at its other end to the screw 332. For raising said cam 330, a post 337, is provided extending upwardly from a link 338, which slides upon the upper face of the flange extending around the bottom of the cam cylinder. Said link is maintained in position by screws 339, passing through slots 340. Pivoted to one end of said link 338, is a link 341, which is pivotally connected to lever 342, which in turn is pivoted to the flange on the cam cylinder. For maintaining the links in the position shown in Fig. XI, a spring 343, is attached to lever 342. In order to throw in the lowering cam 330, at the proper moment determined by the pattern chain, the following mechanism is provided. A horizontal cam 345, is fastened to a horizontal plate 346, capable of being moved up and down. A post 347, depends from the under side of plate 346, and slides in a sleeve 348, extending upwardly from the ledge 2. Two posts 349, and 350, project upwardly from said ledge 2, and pass through holes in plate 346. A coiled spring 351, surrounds post 350, between the under side of plate 346, and the upper side of ledge 2. Secured to the lower end of post 347, is a collar 352, which engages the under side of ledge 2, to limit the upward movement of plate 346, under the influence of spring 351. A lever 354, pivoted to the under side of ledge 2, by a screw 355, has one end normally resting upon the upper face of collar 352, to maintain cam 345, in its lower or inactive position which is too low to allow it to come in contact with the swinging extremity of lever 342. The other end of lever 354, is connected by a link 356, with a finger 358, loosely mounted on a shaft 360. Said lever 354, is normally maintained in the position shown in Fig. IV, by a spring 361. For moving the cam 345, out of action, a cam plate 344, is provided having an upwardly inclined end adapted to slide over the top of cam 345, to draw it below the level of lever 342, where it is maintained by lever 354. A finger 362, is secured to shaft 360, which, when engaged by link 364, on the pattern chain, causes said shaft to partially rotate and throw in the clutch for pawling the pattern wheel as described in my Patent No. 794,407. Pivoted to finger 362, is a finger 377, having a small projection 378, which fits in a notch 379, in one end of a lever 380, pivoted about a screw 381, in the dependent plate 5. In the opposite end of lever 380, is a second notch within which fits a screw 382, threaded into a sliding key 383, fitting a groove 384, formed in the outer face of plate 5. A coiled spring 385, fastened to said lever 380, and to a guard plate 12, at 386, tends to keep said key raised and to return it to its raised position when the high link 387, passes from under the lever.

*X. Mechanism for operating pickers to lower the half back needles.*—The pickers 365, and 366, are mounted so as to operate simultaneously substantially as shown and described in my Patent No. 686,070, dated November 5th, 1901. For throwing said pickers into active position a vertical cam 367, is provided which has its front inclined edge adapted to be engaged by the roller 368, operatively connected to move said pickers simultaneously. Said cam 367, is supported by a vertical plate 369, having two rearwardly extending posts 370, and 371, which slide through holes in the upright standard 14, and maintain said plate in upright position. Depending from post 371, is a short post 372, which forms an abutment for one end of the spring 373, said spring having its other end attached to the base of standard 14. Said spring 373, normally maintains cam 367, in its retracted position. A bent shaft 374, is journaled in plate 6, and has one end in contact with post 372. Upon the other end of said shaft is the finger 375, adapted to be engaged by the high side link 376, on the pattern chain to force the cam 367, into position for engaging roller 368, to throw pickers 365, and 366, into action. In order to throw said pickers out of action the hand lever 306, is lowered and the cam finger 309, raised, the roller 368, moves up the inclined upper surface of said finger and the pickers have their inner ends thrown down to the inoperative position shown in Fig. XI.

*XI. Mechanism for shifting the belt.*— On the rock shaft 130, is secured a disk 390, having a post 391, projecting from one face, said post having a notch 392, in its under side which normally moves over a pin 393, extending beyond the periphery of a cylindrical sleeve 394, mounted to slide on said rock shaft. A post 395, beveled at its upper end, projects upwardly from the yoke 153, and bears against the bevel on sleeve 394, to force said sleeve away from the disk 390. This post is drawn up and lowered at each rotation of the main shaft but the movement of the sleeve 394, is of merely momentary duration, not sufficient to allow the pin 393, to engage post 391. A coiled spring 396, is attached to the disk 390, and the sleeve 394, and normally keeps said sleeve and disk in contact, except when forced apart by post 395. Extending laterally from the sleeve 394, is a finger 397, which is adapted to bear upon the upper end of an L-shaped lever 398, when sleeve 394, is given a partial rotation by the engagement of pin 393, with post 391. This engagement takes place when the post 169, rests upon the upper edge of one of the high pattern jacks as 207, the post 395, is thereby maintained in its elevated position during an entire revolution of the main shaft, thus enabling post 391, to come into contact with pin 393, to positively drive the finger 397, against the upper edge of lever 398. Said lever 398, is thus forced downwardly against pin 399, on link 400, to break the toggle formed by links 400, and 401, and the belt shifter is then moved to throw the driving belt into pulley 37.

*XII. Means for clamping needle cylinder.*—A triangular block 405, is secured to the inside of cylinder 406, said block having a cylindrical hole extending therethrough in which rotates the stem 408, having a handle 409, secured to its lower end. Upon said stem 408, is formed an eccentric 410, which operates against the inner end of a plunger 411, to force its outer end against the inside of the needle cylinder 35.

*XIII. Cam for raising all the needles.*— A cam 415, is mounted to slide vertically in the cam cylinder and has an inclined face 416, adapted to engage the butts of all the needles to bring them up to the proper level for the removal of the needle cylinder. Said cam is secured see Fig. XVIII, to a block 417, which fits a slot 418, in the wall of the cam cylinder. Block 417, is fast to block 419, sliding on the outer surface of the cam cylinder. From the outer block 419, projects a post 420, about which is slidably mounted a sleeve 421, having at one end a ledge 422, which normally rests upon the upper edge of block 419, but is adapted to rest upon the upper edge of cam cylinder 34, when raised sufficiently. A spring 423, surrounds the post 420, and normally tends to keep the ledge 422, pressed against the outside of the cam cylinder. A hand lever 424, is pivoted about the screw 425, and is slotted to receive the sleeve 421. A spring 426, is attached to said hand lever and to the flange at the base of the cam cylinder and normally maintains said hand lever in its lowermost position, and operates to lower the cam 415, when the ledge 422, is withdrawn from the top edge of the cam cylinder.

The operations by which a stocking is knit with the mechanism above set forth are as follows:—The operator turns the pattern wheel until it comes to a stop at the notch 389; the plating cam is in operative position; and high link 387, on the measuring chain is uppermost. The short arm of the lever 104, is then pushed in manually thereby causing the heel yarn to be thrown into action; and a few plain ravel courses are knit. As the pattern wheel is pawled one jack for each revolution, the jack having the low step 188, comes under the post 161, which thus moves downwardly until it rests upon said step and the cam surface 116, is lowered to engage the cam arm of the lower lever 86. This throws in said lever 86, and lever 104, is freed; whereby the body and a plating yarn are thrown into their thread carriers and the heel yarn is removed. Plating now continues until jack 189, comes under post 169. At this point said post is lowered till it strikes the upper end of jack 189; cam 246, is lowered to the level for striking the cam lever 236, to control the individual jacks in the jack ring. The needles, however, are not affected by their individual jacks until the plating cam is put out of action. This occurs when the jack 186, comes under post 169, which drops and raises cam 273, to draw out the plating cam. The needle cylinder is now in the same condition as it would be for plain knitting, but as the individual pattern jacks are now in operation, they affect the needles individually according to the notches and projections on their outer edge. Then jacks 185, to 180, come under post 169, and the cam 246, is lowered to the proper level to throw in levers 237, to 242, in proper sequence. Then when jack 199, comes under post 169, cam 274, is brought into effective position to cause plating cam to be drawn in, and top lever 242, is freed. Plating is therefore knit until the high jack 207, is reached, which causes belt to be thrown on loose pulley 37. The operator then turns the machine by hand and raises cam finger 309, by means of the hand lever 306, which throws up the half back needles, and this rotation of the machine is continued until jack 313, comes under post 171, which thus moves down and causes cam 116, to be lowered to strike cam arm on lever 104, to throw in the heel yarn, and levers 86, and 98, are freed thus removing the body and plating yarns. The measuring chain is then pulled to the right by hand till it is stopped by link 207, whereupon lever 325, is thrown to the right, which throws in clutch and causes oscillation of knitting cylinder; the pattern wheel stops pawling; and the belt shifter handle is also pulled down. The knitting of the heel then proceeds and the measuring chain is pawled until link 364, comes uppermost to start pattern wheel pawling; then high link 387, again comes uppermost, which automatically throws the belt to the pulley 36, releases the clutch and throws handle 325, to the left. The half back needles are lowered by the lowering cam 330, which is moved into active position by the mechanism controlled by the measuring chain, and jack 315, comes under post 161, which drops and lowers cam 116, to the proper level for striking the cam arm on lever 86, whereupon, levers 86, and 98, throw in the body and plating yarn, and lever 104, is freed thereby throwing the heel yarn out of action. Plating is then proceeded with through the foot until high jack 208, is reached, whereupon machine is stopped and the operations are repeated, for the toe pocket the same as for the heel. After the toe pocket is knit the machine knits a few ravel courses, then jack 209, comes under post 169, and the machine stops.

Having thus described my invention, I claim:—

1. In a circular knitting machine, the combination of a series of needles, a thread carrier for said needles, a second thread carrier for said needles, operating simultaneously with said first named carrier, mechanism whereby one or more threads may be introduced into the thread carriers, and mechanism whereby one or more threads may be substituted for those which have been previously introduced, in accordance with the predetermined pattern, means for controlling said needles whereby they receive the thread of the first named thread carrier and pattern controlled means for controlling certain of said needles only, whereby they receive the thread of the second thread carrier.

2. In a circular knitting machine, the combination of a series of needles, means for feeding a body thread to said needles, means for feeding a plating thread at a point above the body thread feeding means, means for raising said needles, so as to receive the body thread, a cam for raising all of said needles so as to receive the plating thread, pattern controlled means operating upon the individual needles, whereby certain of the same only may be raised to receive the plating thread, and pattern controlled mechanism for throwing out of action the plating cam and into action the said pattern controlled means for the individual needles.

3. In a circular knitting machine, the combination of a series of needles, means for feeding a body thread to said needles, means for feeding a plating thread to said needles at a point above the body thread, means for raising said needles so that the same receive the body thread, a cam for raising said needles to receive the plating thread, an independent jack for each needle for raising the same to receive the plating thread, pattern means for causing certain only of said jacks to be operated, and pattern controlled mechanism for throwing out said cam and throwing into action said jacks.

4. A circular knitting machine including in combination, a series of needles, a plurality of thread carriers arranged in different planes, means for causing certain of said needles only to coöperate with the upper thread carrier including a separate jack for each needle, said jacks being provided with means on their outer ends whereby they may be selectively controlled and means for moving said jacks in accordance with a predetermined pattern.

5. A circular knitting machine including in combination, a series of needles, a plurality of thread carriers arranged in different planes, means for causing certain of said needles only to coöperate with the upper thread carrier including a separate jack for each needle, said jacks being provided with means on their outer ends whereby they may be selectively controlled, a plurality of levers adapted to coöperate with the selective means on the jacks, and means for throwing into action first one and then another of said levers, whereby the pattern may be varied in separate courses.

6. In a circular knitting machine having means for utilizing a plurality of threads and a plurality of thread carriers, the combination of the following groups of mechanism: mechanism whereby one or more of the threads may be introduced into the thread carriers; mechanism whereby one or more threads may be substituted for those which have previously been introduced; pattern mechanism for controlling the changing of the threads; and means for controlling individual needles according to a predetermined pattern whereby certain of said needles are caused to take only certain of said threads.

7. In a circular knitting machine having means for utilizing a plurality of threads and a plurality of thread carriers, the combination of the following groups of mechanism: mechanism whereby one or more of the threads may be introduced into the thread carriers; mechanism whereby one or more threads may be substituted for those which have previously been introduced; pattern mechanism for controlling the changing of the threads; and pattern jacks for controlling the individual needles whereby certain of said needles are caused to take only certain of said threads.

8. In a circular knitting machine having means for utilizing a plurality of threads and a plurality of thread carriers, the combination of the following groups of mechanism; mechanism whereby one or more of the threads may be introduced into the thread carriers; mechanism whereby one or more threads may be substituted for those which have previously been introduced; a pattern wheel for controlling the changing of the threads; and means for controlling the individual needles operatively connected with said pattern wheel.

9. In a circular knitting machine having means for utilizing a plurality of threads and a plurality of thread carriers, the combination of the following groups of mechanism; mechanism whereby one or more of the threads may be introduced into the thread carriers; mechanism whereby one or more threads may be substituted for those which have previously been introduced; a horizontal pattern wheel for controlling the changing of the threads; a radial series of pattern jacks for moving individual needles; and means controlled by said pattern wheel for operating said pattern jacks.

10. In a circular knitting machine having means for utilizing a plurality of threads and a plurality of thread carriers, the combination of the following groups of mechanism; mechanism whereby one or more of the threads may be introduced into the thread carriers; mechanism whereby one or more threads may be substituted for those which have previously been introduced; a horizontal pattern wheel having a series of pattern jacks; a radial series of pattern jacks for moving individual needles; a series of levers for moving said individual pattern jacks; and means coöperating with said pattern wheel for controlling said levers.

11. In a circular knitting machine, the combination of a series of needles; a series of radial jacks arranged to move the needles and provided with projections and depressions on their outer ends; and means for moving said jacks in accordance with a predetermined pattern including a plurality of separately operable levers adapted to engage said jacks.

12. In a circular knitting machine, the combination of a series of needles, a series of jacks corresponding to said needles and provided with means on the outer ends thereof, differently disposed with respect to each other, whereby they may be selectively controlled, and means for engaging and moving said jacks in accordance with a predetermined pattern.

13. In a circular knitting machine, the combination of a series of needles; a series of jacks corresponding to said needles and arranged to be moved radially and longitudinally with respect to said needles; means on the outer ends of said jacks differently disposed with respect to each other whereby they may be selectively controlled; means for moving said jacks radially in accordance with a predetermined pattern; means for raising the inner ends of said jacks to raise certain of said needles; means for lowering the inner ends of said jacks; and means for returning said jacks to their initial position.

14. In a circular knitting machine, in combination with the needle and cam cylinders, a ring surrounding the needle cylinder below the cam cylinder; a series of vertical radially disposed jacks mounted with said ring, said jacks being provided with means on the outer ends thereof differently disposed with respect to each other whereby they may be selectively controlled; means for moving said jacks to move the needles in accordance with a predetermined pattern; and means for returning said jacks to their initial position.

15. In a circular knitting machine, the combination of a series of needles, a series of jacks corresponding to said needles and provided with means on their outer ends whereby they may be selectively controlled, and a common means for engaging certain of said jacks only for moving the same into operative relation with the operating means for the jacks, and means for operating said jacks.

16. In a circular knitting machine, in combination with the needle and cam cylinders, a ring surrounding the needle cylinder below the cam cylinder; a series of vertical radially disposed jacks mounted to slide in slots in said ring, and provided with projections and recesses in accordance with a predetermined pattern; a series of levers pivoted to coöperate with the recesses and projections on said jacks; and mechanism for controlling the movement of said levers.

17. In a circular knitting machine, in combination with the needle and cam cylinders, a ring surrounding the needle cylinder below the cam cylinder; a series of vertical radially disposed jacks mounted to slide in slots in said ring, and provided with projections and recesses in accordance with a predetermined pattern; a series of levers pivoted to coöperate with the recesses and projections on said jacks; a spring-pressed trigger plate for holding said levers in coöperative position with respect to the ends of said jacks, whereby when a new lever is introduced any lever previously held by said trigger plate is released.

18. In a circular knitting machine the combination with the needle and cam cylinders; of a plating cam; a series of pattern jacks for controlling the movements of the individual needles; means for throwing said plating cam out of action; and means for controlling the movements of said pattern jacks.

19. In a circular knitting machine the combination with the needle and cam cylinders; of a plating cam; a series of pattern jacks for controlling the movement of the individual needles; and means whereby the plating cam may be first thrown out of action and then the individual pattern jacks thrown into action.

20. In a circular knitting machine the combination with the needle and cam cylinders; of a horizontal pattern wheel having a series of jacks provided with two series of engaging levels; thread changing mechanism controlled by means coöperating with the outer level on said jacks; and mechanism for operating the individual needles controlled by mechanism coöperating with the inner level on said jacks.

21. In a circular knitting machine the combination with the needle and cam cylinders; of a horizontal pattern wheel having a series of jacks provided with two series of engaging levels; thread changing mechanism controlled by a cam arranged to be raised and lowered by mechanism coöperating with one of the engaging levels of said jacks; means for controlling the movements of the individual needles; and a cam operatively connected with the other engaging level of said jacks for controlling the operation of said needle controlling means.

22. In a circular knitting machine the combination with the needle and cam cylinders; of a horizontal pattern wheel having a series of jacks provided with two series of engaging levels; thread changing mechanism controlled by a cam arranged to be raised and lowered by mechanism coöperating with one of the engaging levels of said jacks; means for controlling the movements of the individual needles; a horizontal cam for controlling said individual needle controlling means; and means for varying the position of said cam.

23. In a circular knitting machine the combination with the needle and cam cylinders; of a horizontal pattern wheel having a series of jacks provided with two series of engaging levels; thread changing mechanism controlled by a cam arranged to be raised and lowered by mechanism coöperating with one of the engaging levels of said jacks; means for controlling the movements of the individual needles; a horizontal cam for controlling said individual needle controlling means; and means coöperating with said pattern jacks for varying the vertical position of said cam.

24. In a circular knitting machine the combination with the needle and cam cylinders; of a horizontal pattern wheel having a series of jacks provided with two series of engaging levels; thread changing mechanism controlled by a cam arranged to be raised and lowered by mechanism coöperating with one of the engaging levels of said jacks; means for controlling the movements of the individual needles; a horizontal cam for controlling said individual needle controlling means; and means for varying the vertical position of said cam in accordance with a predetermined pattern.

25. In a circular knitting machine, the combination with needles and pickers, cams for operating said needles, means to rotate and oscillate said cams through an arc whose center has a definite relation with the bed plate of the machine, of a pattern mechanism, means controlled by said pattern mechanism for throwing said pickers into action, and manually controlled means, comprising an element relatively fixed with respect to the bed plate, which may be manually brought into operative relation with the path traversed by the pickers, for throwing said pickers out of action when the machine is in operation.

In testimony whereof, I have hereunto signed my name, at Allentown, Pennsylvania, this twentieth day of May, 1908.

EMIL A. HIRNER.

Witnesses:
  MARCUS S. HOTTENSTEIN,
  RUTH R. ABBOTT.